United States Patent [19]

De Filippi

[11] Patent Number: 4,627,783

[45] Date of Patent: Dec. 9, 1986

[54] REFUSE DISPOSAL APPARATUS AND VEHICLE

[76] Inventor: Quinto De Filippi, 29 Edenvalley Drive, Islington, Ontario, Canada

[21] Appl. No.: 714,881

[22] Filed: Mar. 22, 1985

Related U.S. Application Data

[63] Continuation-in-part of Ser. No. 440,719, Jan. 21, 1983, abandoned.

[51] Int. Cl.$^4$ .................................................. B60P 1/00

[52] U.S. Cl. ................................ 414/517; 100/229 A; 298/23 S; 298/23 MD; 298/23 M; 414/492; 414/513; 414/511

[58] Field of Search .................... 100/229 A; 414/509, 414/510, 511, 512, 513, 514, 515, 516, 517, 492; 298/23 R, 23 MD, 23 S, 23 A, 23 B, 23 F, 23 D, 23 DR

[56] References Cited

U.S. PATENT DOCUMENTS

| | | | |
|---|---|---|---|
| 2,934,226 | 4/1960 | Dempster et al. | 414/517 |
| 3,170,578 | 2/1965 | Moreland | 414/513 |
| 3,198,355 | 8/1965 | Kamin | 414/517 X |
| 3,541,949 | 11/1970 | Clar | 100/229 A X |
| 3,647,098 | 3/1972 | Smith | 414/492 |
| 3,661,281 | 5/1972 | Herpick et al. | 414/509 X |
| 3,757,969 | 9/1973 | Smith | 414/517 |
| 3,802,585 | 4/1974 | Churchman | 414/517 |
| 3,819,071 | 6/1974 | Liberman | 414/517 |
| 3,860,288 | 1/1975 | Martin et al. | 298/23 MD |
| 3,865,260 | 2/1975 | Weischel et al. | 414/517 |
| 4,173,424 | 11/1979 | Whitehead et al. | 414/517 |
| 4,234,130 | 11/1980 | Trott et al. | 414/511 X |
| 4,307,541 | 12/1981 | Farmer et al. | 298/23 S X |
| 4,316,695 | 2/1982 | Knight, Sr. | 414/517 |

FOREIGN PATENT DOCUMENTS

| | | | |
|---|---|---|---|
| 0575981 | 5/1954 | Canada | 414/492 |
| 575981 | 5/1959 | Canada | 414/492 |
| 2345597 | 3/1975 | Fed. Rep. of Germany | 298/23 S |
| 2609599 | 9/1976 | Fed. Rep. of Germany | 414/517 |
| 178941 | 11/1982 | Japan | 414/511 |
| 391081 | 4/1933 | United Kingdom | 298/23 S |

*Primary Examiner*—Frank E. Werner
*Attorney, Agent, or Firm*—George A. Rolston

[57] ABSTRACT

A refuse compacting system having an elongated hopper of rectangular cross-section with an ejection opening at one end, a tailgate movable for opening and closing the ejection opening, a refuse entry opening in the top of the hopper, a compactor within the hopper, located at one end, and pairs of dual parallel connected cylinders for moving the compactor towards the ejection opening and back again.

9 Claims, 14 Drawing Figures

REFUSE DISPOSAL APPARATUS AND VEHICLE

This application is a continuation-in-part of application Ser. No. 440,719, REFUSE DISPOSAL APPARATUS AND VEHICLE, filed Jan. 21, 1983, now abandoned.

The invention relates to a refuse disposal system, and in particular to a refuse disposal vehicle incorporating such a system.

The collection, storage and transportation of refuse requires in the majority of cases that the refuse shall be crushed and compacted to the greatest density practicable, for reasons of economy.

Numerous different compactors have been proposed and are in use. Some of such compactors are stationary, on site systems, and are designed for compacting and compiling refuse into a container for transport. Other compactor systems are incorporated on truck mounted transport vehicles, so that the refuse can actually be compacted in the storage compartment of the vehicle.

In some systems, refuse is dumped at the rear, and the compactor system is then operated. This system is called a rear loader packer.

When the vehicle container is full, the vehicle is then driven to a dump site and the contents are emptied out.

This type of vehicle is commonly used by municipalities and private contractors for curb side collection where refuse is stored in smaller bags or containers.

Industrial and commercial operations such as office buildings, apartments, institutions, shopping plazas and construction sites usually gather refuse in large rectangular bins or containers. In this case different refuse vehicles are used employing a hoist and tipping mechanism, and an open-topped hopper receptacle on the vehicle. The hoist raises the bin or container above the vehicle and inverts it, dumping the refuse into the hopper at the front of the body. The refuse is then pushed to the rear of the hopper body to clear the hopper for the next load.

In many cases refuse in this type of vehicle is not compacted at all, causing considerable extra expense. The design of a compactor for this type of open-topped hopper presents certain problems.

In particular, the compactor must not occupy space required for refuse, and also it must not obstruct ejection of the refuse at a dump site.

The simplest way of ejecting the contents of any such vehicle is simply to provide a tilting body so that the contents can be ejected out of the rear, but for various reasons this is difficult to design.

Where a compacting system is located at the rear of the vehicle, then it becomes difficult to provide for dumping of refuse from the rear of the vehicle since the tailgate must be raised.

This factor has been well recognized in various proposals shown in the patent art. Many inventors have attempted to provide refuse systems suitable for mounting on vehicle bodies, in which the compacting system is located at the forward end of the hopper body. A swingable tailgate is located at the rear end of the body, so that the compactor forces the refuse from the front to the rear of the container.

When the body is full, all that is required is simply to open the tailgate and tilt the body rearwardly. The compactor, being located at the front of the vehicle, is no longer an obstruction.

Numerous factors have, however, worked against the successful operation of such devices.

For example, in one proposal the compaction of garbage was carried out in a separate, smaller compartment located at the front of the vehicle, and a reciprocating blade operated by a piston system provided a degree of compaction. However, in this system the compactor and the piston was located between the driver's cab and the refuse hopper. It thus occupied a significant amount of length on the truck bed, which length could then not be used for actual storage of compacted refuse.

In addition to this disadvantage, such a system was generally speaking, suitable only for curb side collection of refuse, where the refuse is contained in bags or other small containers.

A compacting system of this type was not suitable where the refuse was stored in large rectangular metal hoppers, or bins of the type used for the collection of refuse in commercial establishments, such as building sites, shopping plazas, office buildings and the like.

An additional disadvantage of this proposal was that the tailgate was required to withstand continual pressure from the compactor. Generally speaking, it was found that the tailgate could not be locked in a satisfactory manner so that the compacting forces tended to open it, causing escape of refuse.

For all of these reasons this particular earlier proposal did not enjoy significant success.

Other problems have arisen from the design of the tailgate itself.

In this type of refuse system, where the compactor is located at the front of the body, and the ejection opening is located at the rear, the tailgate must perform a variety of functions. In the first place, it must close the rear end of the body, but must be capable of being swung away for ejection of refuse. It should also preferably be contoured so as to permit refuse to move upwardly within the body during the compacting procedure.

In addition to these requirements, however, problems exist from the design of the compacting system itself. Thus, where the compactor is required to eject the contents of the body, it is desirable that the compactor blade or pusher shall in fact move to the full extent of the body, and preferably outside it to a minor extent, so as to ensure clearing of all refuse within the body. The power operated systems for moving such a compactor blade or pusher usually involve elongated power cylinders. Where such cylinders extend alongside the compactor blade into the body itself, then when the compactor blade is moved to the rear of the body, portions of the power cylinders themselves will extend outwardly. The tailgate should thus be so constructed as to permit the compactor blade and its power cylinders to move throughout the full extent of its cycle, with the tailgate closed, so as to ensure maximum compaction of refuse. In the past, there has been no comprehensive solution to all of these problems, and generally speaking, the use of a front mounted compactor, with a rear opening and tailgate system, have proved incompatible with all of these various objectives.

Further problems arise from the design of the power cylinders themselves. In the great majority of such systems, power is supplied by a hydraulic pump which may typically be driven by a stationary engine or by a power take-off if the system is mounted on a vehicle. Such cylinders will achieve a power stroke which is only the same length as the cylinder itself. In order to provide a longer power stroke, a telescopic cylinder system has been developed in the past which provided a power stroke which was twice the length of the cylinders. However, such telescoping cylinders were costly to manufacture, and were the cause of frequent breakdowns and maintenance and servicing problems.

They have not proved satisfactory for the purpose.

While reference has been made above to vehicle mounted systems, it will of course be appreciated that the invention described is equally applicable, both to stationary, on-site systems and also to vehicle mounted systems. Accordingly, reference throughout this specification to "body" or "hopper" is intended to refer simply to a system of walls defining a chamber, which chamber may be mounted on a vehicle bed, or may be mounted in a stationary location.

BRIEF SUMMARY OF THE INVENTION

With a view to overcoming the various disadvantages set out above, the invention consists of a refuse compacting system comprising an elongated refuse hopper body, having a generally regular shape in cross-section along its length, and defining a bottom wall, sides and a top, and having an ejection opening at one end, a movable door member movable between opening and closing positions for said ejection opening, a refuse entry opening in its top wall, a compactor assembly within said hopper, and being normally located at an end thereof remote from said ejection end, and having a dimension sufficient to substantially fill said cross-section of said container, and power cylinders for moving said compactor assembly from said one end towards said ejection end and back again, which cylinders comprise pairs of cylinders fastened together in side-by-side parallel relation, with their cylinder rods extending in opposite directions, one of such rods being connected to the compactor, and the other of such rods being fixed in relation to the hopper body.

More particularly, the invention comprises such a refuse compactor system in which the door member for the ejection opening comprises an elongated extension of said hopper, and including locking means for locking said door member in its closed position.

More particularly, the invention comprises such a refuse compactor system wherein the compactor assembly comprises a compactor blade, and support means for supporting said blade at a suitable position within the container, and wherein the power operated means comprise dual parallel power cylinders, mounted side by side for moving the blade member from one end of the container to the other.

A related feature of the invention is the provision of a refuse hopper or body of a predetermined length, having a compactor system movable along a compactor path of substantially the same length as said body, and having power operated movement means extending into said body, and a tailgate apparatus defining an elongated extension of such body, permitting such power operated means to extend into such tailgate when the compactor assembly is fully extended.

It is a related feature of the invention to provide a dual acting power cylinder apparatus having a pair of cylinders fastened parallel side-by-side with each other operating respective piston rods extending the same in opposite directions.

It is a related invention to provide a tailgate, having a tailgate locking assembly incorporating a movable latch mechanism, the movable latch mechanism being responsive to movement of the tailgate raising apparatus, to unlatch and relatch, during opening and closing of the tailgate, automatically.

A preferred form of the invention is designed for mounting on a vehicle truck bed, although the invention would be applicable in some aspects to a stationary installation, as an on-site refuse compactor, if such was desired.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figures 1, 2:
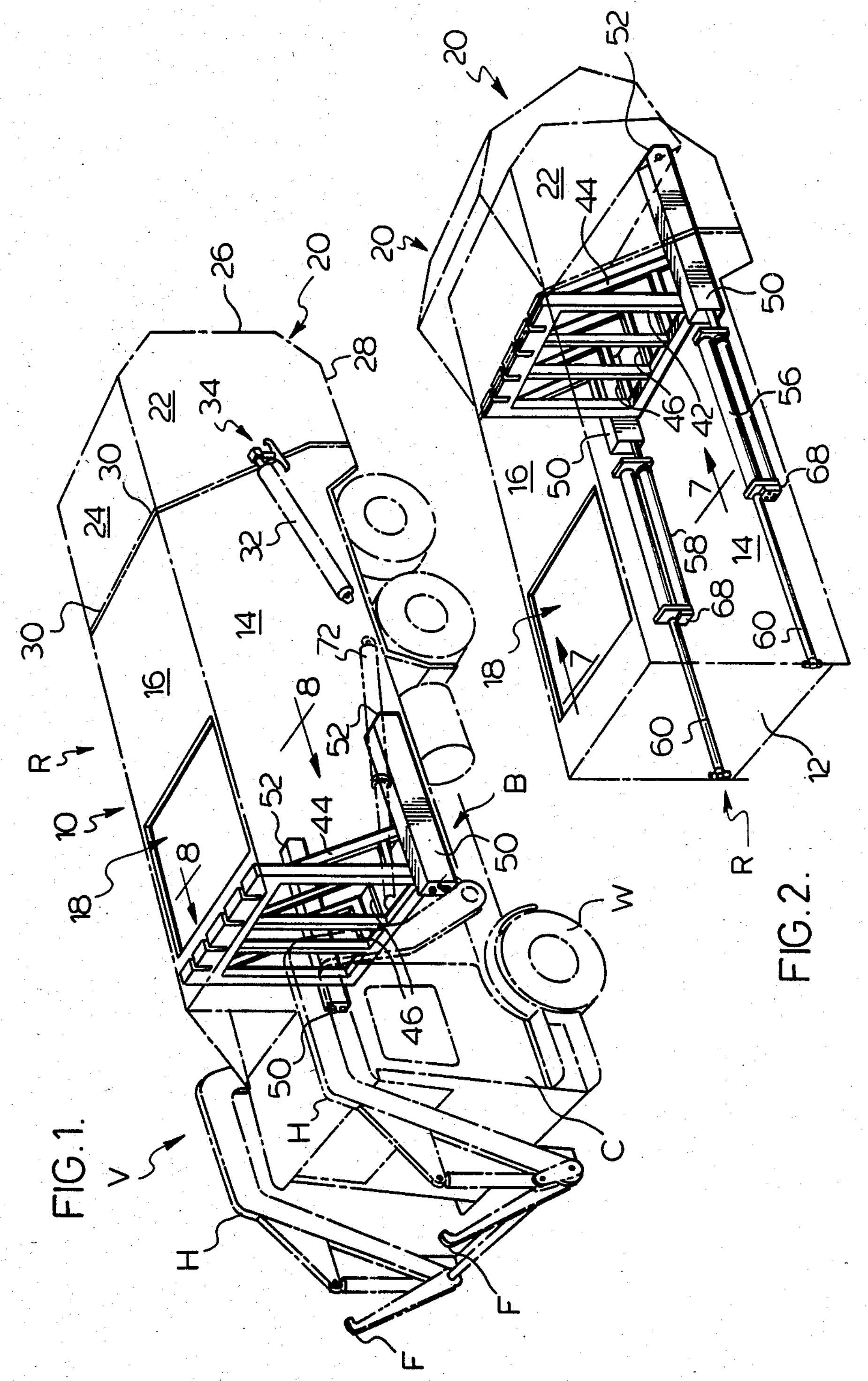
FIG. 1 is a perspective illustration showing, in phantom form, a refuse vehicle and hoisting system, with the refuse container and compactor according to the invention shown in location on the vehicle body.
FIG. 2 is a perspective illustration corresponding to FIG. 1, showing the refuse container and compacting system in isolation, with the compacting system in another position.

As shown in FIG. 1, the invention is illustrated as mounted on a refuse vehicle of the type designed to hoist and dump refuse bins or containers. Such refuse containers are normally distributed, for example, on a suitable rental agreement, to various sites such as construction locations, shopping plazas, commercial buildings, office buildings, and the like, and governmental institutions, where refuse accumulates in large volumes. Maintenance personnel employed at the site will collect refuse from a variety of locations and simply dump it in such a container.

As is well known in the art, the containers are usually emptied at regular intervals by the refuse contractor, by means of a vehicle equipped with a hoist.

In FIG. 1 a vehicle is illustrated as V, having wheels W, and a driver's cab C, and a framework or truck bed B.

In the majority of such vehicles, a front mounted hoist H is provided of a type well known in the art, having any suitable engagement means such as arms or forks F, which may be lowered down and introduced into suitable locations such as sleeves on the refuse container R at the site.

The function of such a hoist in the normal case is simply to lift the container, which may have an open top in some cases or which may have a pair of hinged lid plates, and then to raise the container above the vehicle, and then to invert it so that the contents simply dump out into the vehicle body or hopper.

The details of such hoisting mechanism are well known in the art, although they may vary from one manufacturer to another. The function and design are readily available, and accordingly such description is omitted for the sake of clarity.

In accordance with the invention, the refuse collecting and compacting system used on the vehicle V will be seen to comprise the body or hopper 10, having a bottom wall 12, side walls 14—14 and a top wall 16. As will be seen from the drawings, the hopper 10 has a regular cross-section along its length, which in this case is rectangular.

An opening for entry of loose refuse is shown as 18, and is located in the forward part of the top wall 16.

A rear tailgate assembly comprises side walls 22, a top wall 24, and a three-part rear wall 26, and a bottom wall 28. Top wall 24 of tailgate 20 is hingedly mounted to top wall 16 of body 10 as at 30, enabling it to function as a tailgate.

Tailgate 20 may be swung upwardly and downwardly by means of power cylinders 32. Any suitable power source such as a hydraulic pump (not shown) may be employed for powering cylinders 32 in accordance with a manner well known in the art. Suitable controls will be provided, typically in the cab C, for operation of cylinders 32.

A suitable locking mechanism indicated generally as 34 may be provided, for locking the tailgate 20 in its closed position, as shown in FIG. 1, so that refuse cannot escape during use. Various different locking mechanisms may be used for the purpose which may be either manually operated, or may be separately operated by suitable controls, or in the preferred case, may be self-actuating upon operation of cylinders 32 to open tailgate 20.

The details of such a preferred form of locking mechanism 34 are shown below in FIGS. 10 to 14.

In order to provide for compaction of refuse a compactor assembly is provided which comprises a compactor blade member 40, in this case having a generally rectangular shape, supported at a suitable angle on the framework 42, and braced by angled ribs 44 extending from an upper portion of framework 42.

Lower bracing struts 46 extend between ribs 44 and frame 42, to form, in side elevational view, the appearance of a right-angled triangle.

Additional intermediate cross-bracing members 48 may be located on the rearward side of blade 40 to give it additional strength.

Blade 40 is somewhat wider than the frame 42, for reasons to be described below, and will correspond in shape to the shape of the interior of body or hopper 10, so as to prevent refuse from escaping around the edges of such blade.

Figure 3:
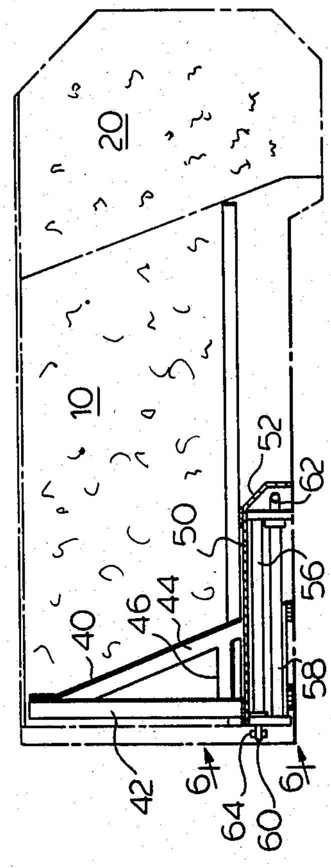
FIG. 3 is a side elevational view of the compacting system in a first position, showing the refuse container in phantom.
Figure 4:
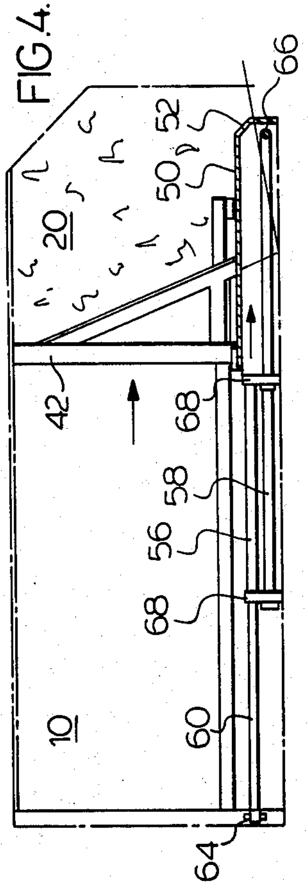
FIG. 4 is a view corresponding to FIG. 3 showing the compacting system fully extended.

Frame 42 is mounted, at its lower extent, between a pair of slidable cylinder housing members 50 of generally rectangular shape in section, and is movable lengthwise from front to rear of the body 10, along a compaction path consisting of a forward or fully retracted position as shown in FIGS. 1 and 3, and a rearward fully extended position as shown in FIGS. 2 and 4.

It will be noted that in the forward fully retracted position as shown in FIG. 1 the blade 40 leaves the entry opening 18 open for introduction of uncompacted refuse from a container R. As the blade member 40 is moved rearwardly into its extended position, such refuse will be forced rearwardly, first of all through body 10, and eventually into tailgate 20.

For the purpose of efficient compaction, and dumping of refuse, it is necessary that the working stroke of the compactor blade 40 shall extend to the end of body 10.

This range of movement is greater than can be readily achieved using a power operated means such as a single cylinder and piston rod. The range of operation of such a cylinder is equal to the internal length of the cylinder. Consequently, in order to move the blade assembly 40 the length of the body, it would be necessary to have a cylinder substantially equal to the length of such body. This would become unwieldly and difficult to engineer.

Accordingly, cylinder housings 50 are provided, associated with the blade assembly 40. The cylinder housings 50 extend from a point adjacent frame 42, and from thence rearwardly, passing supporting ribs 44 and plate 40, and entering a lower region of body 10. Cylinder housings 50 are open at their forward ends, and terminate at their rearward ends in the two-part angled closure faces 52.

Figure 7:
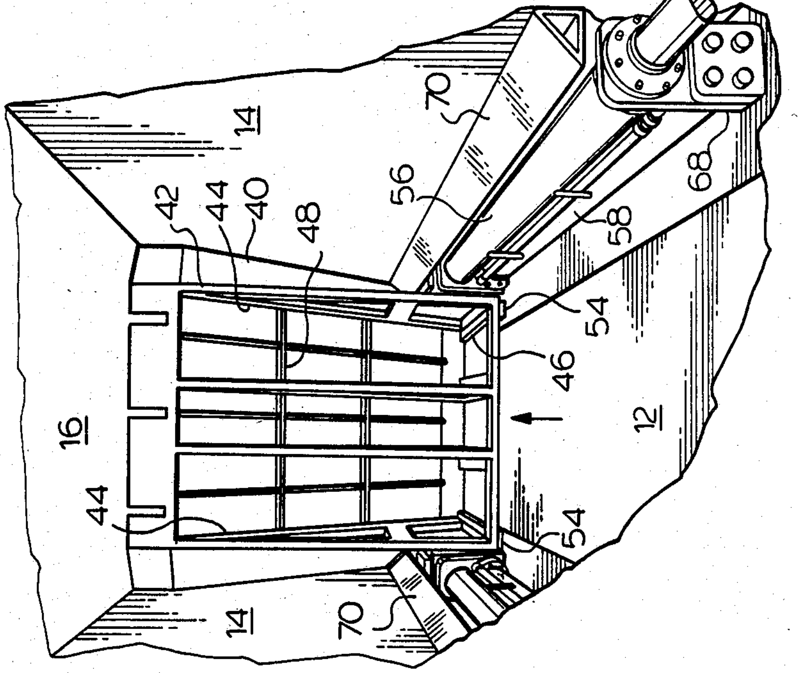
FIG. 7 is an interior perspective illustration from the front of the container looking rearwardly at the back of the compactor system, which is shown fully extended, in a position essentially similar to that of FIGS. 2 and 5.
Figure 10:
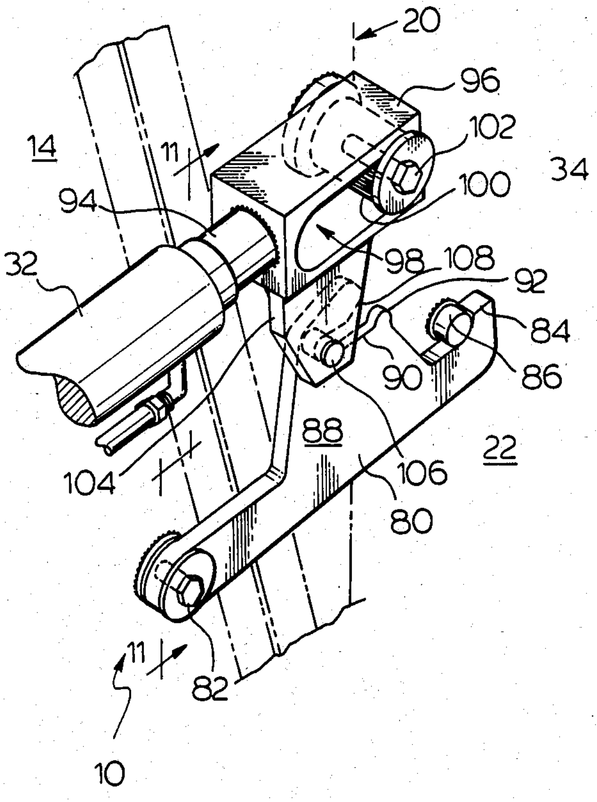
FIG. 10 is an enlarged perspective illustration of the tailgate locking mechanism, shown in its locked position.
Figure 11:
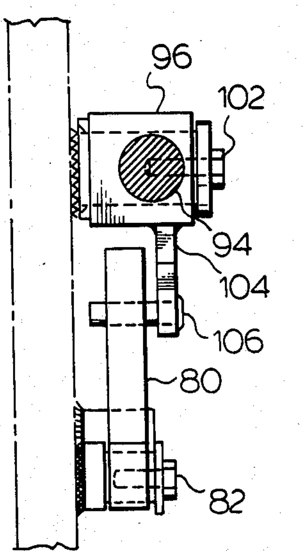
FIG. 11 is a section along the line 11—11 of FIG. 10.
Figure 12:
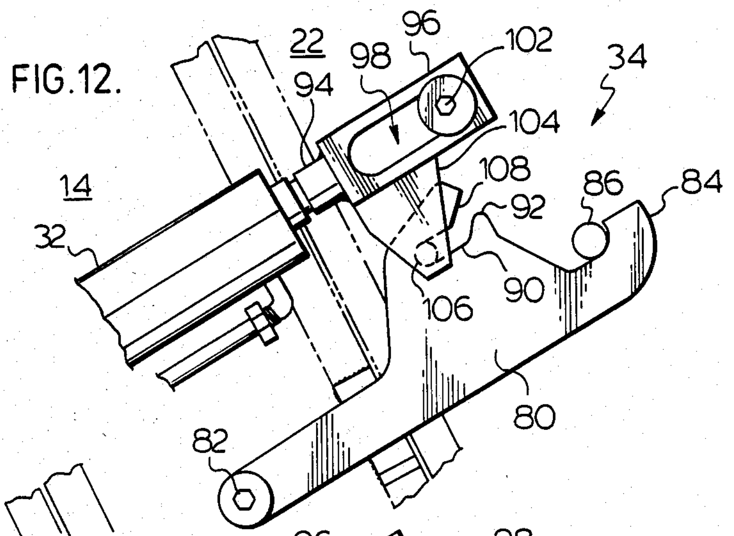
FIG. 12 is a side elevational view of the locking mechanism of FIG. 10.
Figure 13:
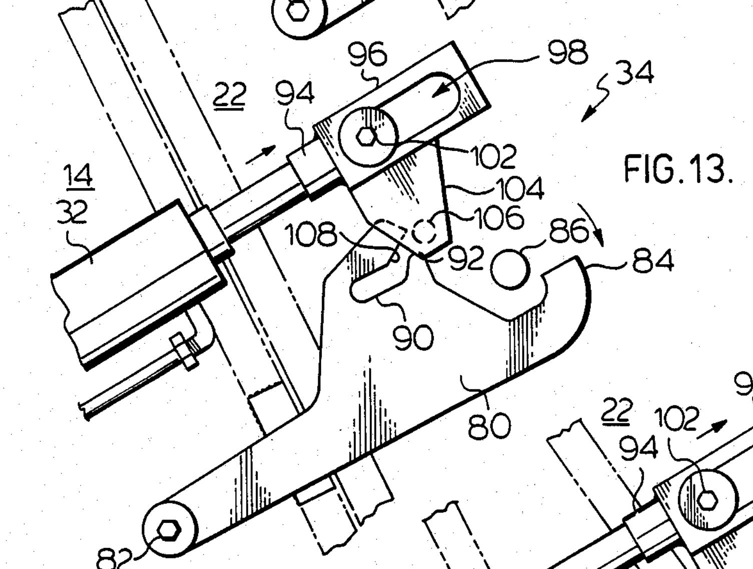
FIG. 13 is the same side elevational view, showing the mechanism partially unlatched, and, FIG. 14 is the same side elevation showing the mechanism unlatched, with the tailgate partially open.
Figure 14:
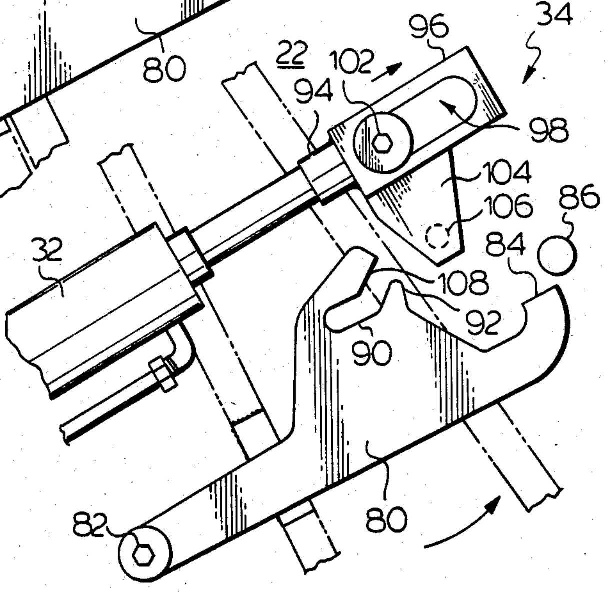

Frame 42 is slidably supported on floor 12 by means of slide pads 54 (FIG. 7) so that its weight is supported, while permitting it to slide to and fro.

Movement of the blade 40 and frame 42 is produced by means of two pairs of cylinders fastened parallel and side-by-side with each other indicated as 56 and 58.

Cylinders 56 and 58 are each contained within the cylinder housings 50, and are of approximately the same length as cylinder housings 50. Thus when in the fully retracted forward position as shown in FIG. 3, the two cylinders 56 and 58, and the cylinder housings 50, all retracted essentially together. This permits the frame 42 to lie at its forwardmost possible position within body 10, thereby enabling the blade 40 to be located forwardly and thus clear the opening 18 to permit entry of fresh refuse.

Cylinders 56 and 58 are mounted so that their respective operating rods 60 and 62 extend therefrom in opposite directions.

Cylinder rod 60 extends through the forward end of body 10, and is fastened as at 64 to such body 10.

Cylinder rod 62 extends up to the front closure 52 of housing 50, and is there fastened as at 66.

Cylinders 56 and 58 are tied together at each end by means of connecting plates 68.

Figure 5:
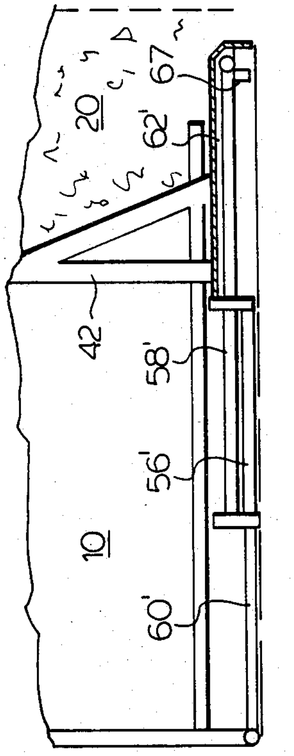
FIG. 5 is a view corresponding to FIG. 4 showing an alternate embodiment.
Figure 8:
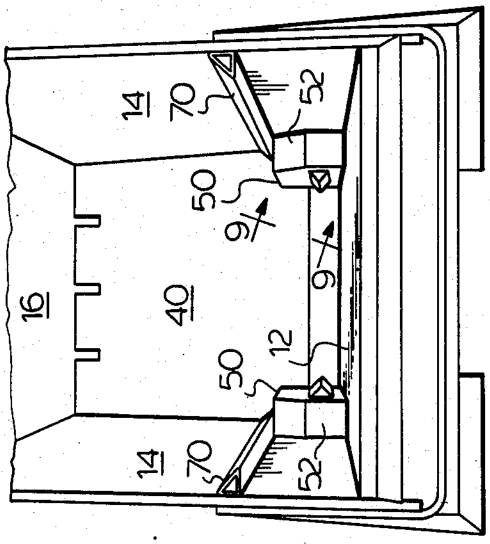
FIG. 8 is a perspective illustration looking from the rear of the container forwardly, at the rearwardly directed face of the compactor system, with the compactor fully retracted, in a position essentially corresponding to that shown in FIGS. 1 and 3.
Figure 9:
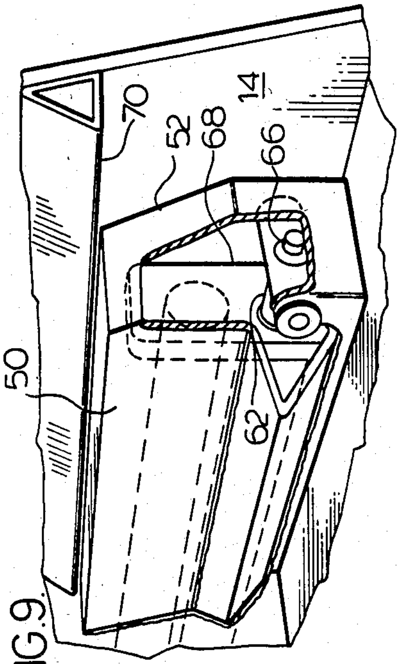
FIG. 9 is a perspective illustration partially cut away, showing the installation of the cylinders for the compacting system.

When both operating rods 60 and 62 are fully extended, the cylinders 56 and 58 will still lie side by side to one another, since they are tied by means of plates 68, but will have been extended from housings 50, essentially as shown in FIGS. 2 and 5.

Power is supplied to cylinders 56 and 58 from any suitable source, typically being a hydraulic pump and reservoir of well-known design, and the controls therefore will typically be incorporated in a control panel in the cab C.

Typically, power is supplied by the vehicle engine through any suitable power take-off system. Alternately, any suitable prime mover can be used.

Guide members 70 are attached along opposite side walls of container 10 and contact the upper surfaces of housings 50. In this way guides 70 prevent any tendency for housings 50 to angle upwardly during extension of cylinder rods 60 and 62.

In some cases there may be advantages to be gained by re-arranging the cylinders 56 and 58, the other way. Thus, as shown in FIG. 5, cylinder 56′ is the lower cylinder and cylinder 58′ is the upper cylinder. This arrangement ensures that the forward cylinder rod 62′ is clear of the floor of the hopper body. A clean out port 67 can then be opened up in the outward side wall of housing 50. Any refuse which collects in the housing can thus be loosened and removed by hand.

When fully extended, the cylinders should extend the blade 42 so that its bottom edge is at or preferably just beyond the floor or bottom wall 12 of the body 10. This ensures that all refuse is fully ejected when dumping the contents.

When fully retracted, the upper edge of the blade should clear opening 18 in top wall 16 so as to permit the filling of the hopper.

This is achieved by locating the two pairs of cylinders 56 and 58 on either side of the blade assembly 42, and by providing cylinder housings 50, which are fastened to the blade assembly 40, and which extend rearwardly of the blade assembly into the interior of the body or hopper 10.

The sloping angle of the blade also assists in achieving these objectives.

It will however be appreciated that the length of the cylinder housings 50 which extend rearwardly beyond the blade assembly 42, must be accommodated by extending the tailgate 20 to a sufficient length. In this way the blade assembly 40 can be cycled during its compacting cycle, to its fullest extent, without the cylinders 50 interfering with the tailgate 20.

At the same time, however, it will of course be understood that the cylinders 56 and 58 cannot simply be made longer so as to achieve a longer compacting stroke. Again, there are practical limits to the length of which such cylinders can be made. One of the limits is set by the possible length of the entire body 10 and tailgate 20 which may be permitted by highway authorities. This limitation would not of course apply to situations where the compacting system and hopper were to be used in a stationary location, in which case other considerations would determine the length of the various members.

Figure 6:
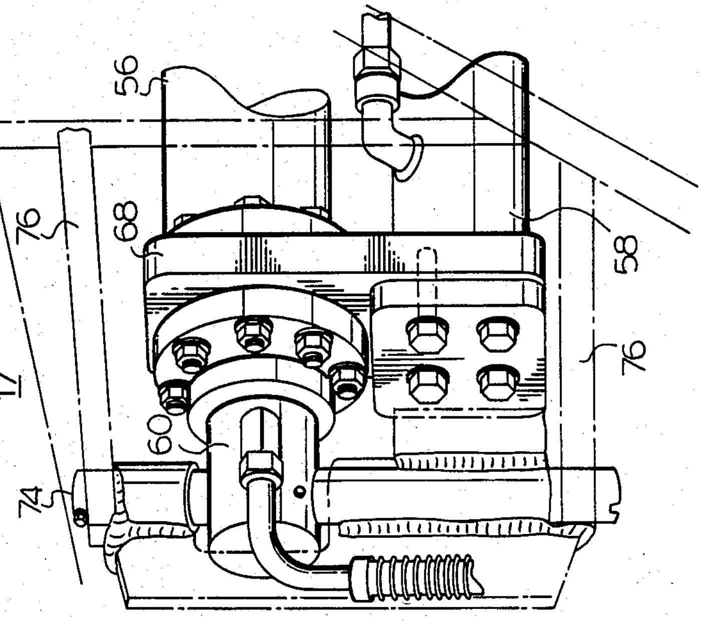
FIG. 6 is a perspective illustration of a detail of the cylinder mechanism forming part of the compacting system.

For the purposes of the vehicle mounted installation, such cylinders 56 and 58 are conveniently mounted as shown in FIG. 6 by passing them through the front wall 17 of the body 10. The cylinder shaft 60 is fastened as at 64, by means of a rod 74, and brackets 76.

The locking mechanism indicated generally as 34, for locking the tailgate 20, is shown in more detail in FIGS. 10 through 14. Such mechanism 34 will be seen to comprise a latch plate member 80 hingedly mounted by means of bolt 82, or the like, to the side wall 14 of body 10. The latch 80 has a free end formed with a hook 84. The hook 84 is adapted to overlie the side wall 22 of tailgate 20. A latching hinge 86 is fastened to side wall 22, for engagement by hook 84.

The length of latching plate 80 in the location of the pin 86 is such that when the hook 84 is in engagement with the pin 86, the tailgate 20 is secured closed, and any compacting loads or stresses imposed by operation of the compactor assembly within the body 10, which would otherwise tend to open up the tailgate 20, will be resisted by the latching plate 80.

It will of course be appreciated that there are two such latching assemblies 34, one on either side of the body 10 and tailgate 20.

In order to operate the latch plate member 80, between locking and releasing positions, a flange portion 88 extends upwardly and is provided with a slotted opening 90, having an upwardly angled ramp portion 92 at its open end.

The tailgate operating cylinder 32 is provided with a shaft 94 having a block 96 on its free end. The block 96 is formed with an elongated slotted opening 98. A boss 100 is secured to the side wall 22 of the tailgate 20, and extends through the slot 98. The block 96 is secured in position by means such as the washer and bolt 102 on the free end of the boss 100.

A downwardly plate 104 is fastened to a lower portion of the block 96, and is provided with an operating pin 106, which is adapted to fit within the slotted opening 90.

Operation of the tailgate cylinder 32, to extend the shaft 94 will thus first of all cause the block 96 to slide rearwardly relative to the boss 100, so that the boss 100 moves from one end to the other of the slot 98. This movement will likewise cause the pin 106 to move rearwardly along the slot 90, until it meets the ramp 92. Further movement will cause the pin 106 to ride up the ramp 92. However, since the pin 106 cannot move upwardly, being held by the boss 100 in the slot 98, this will in effect cause relative downward movement of the ramp 92 and associated latching plate member 80.

This will cause the tooth 84 to release from the pin 86.

The tailgate 20 will thus be unlatched. Further operation of the cylinder 32 will simply cause a further extension of the shaft 94, which will thus raise the tailgate upwardly as shown in phantom in FIG. 2.

Clearly, reverse movement will simply produce the reverse of these operations, except that in this case the pin 106 will first of all be brought into engagement with the angled surface 108, before it enters the slot 90. As it moves along the angled surface 108, the pin 106 will then raise the plate 80 upwardly, bringing the tooth 84 into engagement with the pin 86 thereby locking the tailgate closed.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A refuse compacting system comprising:

an elongated refuse container having a generally rectangular shape in cross-section, and defining a bottom wall, side walls and a top wall, and having an ejection opening at an ejection end thereof;

a movable door member movable between opening and closing positions for said ejection opening said door member having a generally horizontally directed power means with a lost motion connection that simultaneously moves and locks/unlocks the door member;

a refuse entry opening in said top wall at an entry end of said container;

a compactor assembly within said container, and being normally located at said entry end thereof remote from said ejection end, and having a dimension sufficient to substantially fill said rectangular cross-section of said container, and said compactor assembly including a generally angled blade member defining width and height dimensions substantially equal to the width and height of the interior of said refuse container, said blade member having a lower portion closer to said ejection opening and an upper portion more remote therefrom, and load bearing supporting means located on one side of said blade member, supporting and bracing the same at such angle;

power operated means including two pairs of dual parallel connected power cylinders, mounted side-by-side on opposite sides of said compactor assembly;

connection means extending between each said cylinder in a said pair, securing same together in parallel side-by-side relation for movement in unison;

a cylinder rod extending from each said cylinder in a said pair, a first said cylinder rod extending towards said entry end, and being fixed, a second said cylinder rod extending towards said ejection end and attached to said compactor assembly, operation of said cylinders procuring movement of said compactor assembly and both said cylinders in both said pairs simultaneously, while said first cylinder rods in both said pairs remain stationary for moving said compactor assembly from said entry end towards said ejection end and back again for compacting refuse and for ejecting refuse;

power cylinder housing means of elongated hollow shape having upper walls and side walls, and being closed at their forward ends and open at their rearward ends, said housing means being attached to said compactor assembly on either side thereof adjacent said lower portion of said blade member, and said housing means extending from said blade member on the side thereof remote from said load bearing supporting means and towards said ejection opening along each side of said refuse container, and, guide rail means fastened within said refuse container on either side thereof, and extending substantially uninterrupted from one end to the other of said container, and engaging said upper walls of respective said power cylinder housing means, whereby to restrain tilting movement of said compactor assembly, during operation of said cylinders whereby said power cylinder housing means may move along substantially the full length of said container from one end to the other, said movement being guided by said guide means throughout the full extent thereof.

2. A refuse compactor system as claimed in claim 1 wherein the door member for the ejection opening comprises an elongated extension of said container.

3. A refuse compactor system as claimed in claim 2 wherein said door member comprises a bottom wall, side walls, a top wall, and an end wall, and being open at its front, the front of said door member mating with said ejection opening at said ejection end of said refuse container, whereby a quantity of such refuse may be stored and carried within said door member, thereby increasing the storage capacity of such container, said door member being hinged along its said top wall to the top wall of said container, and said power means connected to said door member, whereby it may be swung upwardly and downwardly.

4. A refuse compactor system as claimed in claim 3 wherein said power means is connected between said container and said door member, said power means further being connected to said locking means, for remote operation of said locking means.

5. A refuse compactor system as claimed in claim 1 wherein said compactor assembly comprises a blade member of generally rectangular shape in elevation, and means supporting said blade member at an angle within said container, whereby at least the upper edge of said blade member is located clear of said refuse entry opening in one position, to facilitate the dumping of refuse in said container.

6. A refuse compactor system as claimed in claim 1 wherein said movable door member comprises a tailgate defining an elongated extension of said refuse container, permitting said power operated means to extend into said tailgate when the compactor assembly is fully extended.

7. A refuse compactor system as claimed in claim 6 wherein said refuse container defines a predetermined width and height in cross-section, and wherein said tailgate defines at least the same width and height in cross-section whereby a portion at least of said compactor assembly may be extended through and from said refuse container, and at least partially into said tailgate.

8. A refuse compactor system as claimed in claim 7 wherein said refuse container has a bottom wall, said compactor assembly moving along said bottom wall, and wherein said tailgate has a bottom wall, being located in a plane below the bottom wall of said refuse container.

9. A refuse compacting system as claimed in claim 1, wherein said pairs of power cylinders are arranged with upper and lower cylinders in each pair, said lower cylinder being directed away from said ejection end and said upper cylinder being directed towards said ejection end, and openings in said power cylinder housing means adjacent said closed ends thereof for access to said housing means for clearing.

* * * * *